United States Patent
Fernando et al.

(10) Patent No.: US 11,911,905 B2
(45) Date of Patent: Feb. 27, 2024

(54) ROBOT CONTROL APPARATUS, ROBOT CONTROL METHOD, AND ROBOT CONTROL SYSTEM

(71) Applicant: Telexistence Inc., Tokyo (JP)

(72) Inventors: Charith Lasantha Fernando, Tokyo (JP); Jan Rod, Tokyo (JP); Takashi Iwasa, Tokyo (JP)

(73) Assignee: Telexistence Inc., Toyko (JP)

( * ) Notice: Subject to any disclaimer, the term of this patent is extended or adjusted under 35 U.S.C. 154(b) by 395 days.

(21) Appl. No.: 17/196,245

(22) Filed: Mar. 9, 2021

(65) Prior Publication Data

US 2021/0187738 A1    Jun. 24, 2021

Related U.S. Application Data

(63) Continuation of application No. PCT/JP2019/034796, filed on Sep. 4, 2019.

(30) Foreign Application Priority Data

Sep. 10, 2018   (JP) .................................. 2018-168601

(51) Int. Cl.
    B25J 9/16       (2006.01)
    B25J 3/00       (2006.01)
    B25J 9/00       (2006.01)

(52) U.S. Cl.
    CPC .............. B25J 9/1661 (2013.01); B25J 3/00 (2013.01); B25J 9/0084 (2013.01); B25J 9/1602 (2013.01)

(58) Field of Classification Search
    CPC ......... B25J 9/1661; B25J 3/00; B25J 9/0084; B25J 9/1602; B25J 9/1689; G05B 2219/40146; G05B 2219/40174
    See application file for complete search history.

(56) References Cited

U.S. PATENT DOCUMENTS

| | | | |
|---|---|---|---|
| 10,759,049 B2* | 9/2020 | Yuzawa | B25J 11/008 |
| 2018/0004202 A1* | 1/2018 | Onaga | H04L 67/125 |
| 2018/0311815 A1* | 11/2018 | Shaw | B25J 9/1671 |
| 2019/0227551 A1* | 7/2019 | Igata | G06Q 10/0836 |
| 2019/0269290 A1* | 9/2019 | Morita | G01B 11/10 |

FOREIGN PATENT DOCUMENTS

| | | |
|---|---|---|
| JP | 2002-245374 | 8/2002 |
| JP | 2012-089174 | 5/2012 |
| JP | 2014-503376 | 2/2014 |
| JP | 2018-161704 | 10/2018 |
| WO | 2017/033360 | 3/2017 |

OTHER PUBLICATIONS

International Search Report, dated Nov. 19, 2019, 5 pages.
Written Opinion of the International Searching Authority dated Nov. 19, 2019 filed in PCT/JP2019/034796, 13 pages.

* cited by examiner

*Primary Examiner* — Kira Nguyen

(74) *Attorney, Agent, or Firm* — Rankin, Hill & Clark LLP

(57) ABSTRACT

A robot control apparatus includes a selection part that selects a scenario to be used which an operator who operates a robot uses while operating the robot from among a plurality of scenario candidates in which an elapsed time since the robot has started an action and action contents of the robot are associated with each other, and a robot control part that controls the robot on the basis of the scenario to be used.

23 Claims, 8 Drawing Sheets

| Sales-floor-A scenario (1) | |
|---|---|
| Elapsed time | Action contents |
| 0 minutes to 1 minute | Move to a5 |
| 1 minute to 2 minutes | Move to a3 |
| 2 minutes to 3 minutes | Move to a2 |
| 4 minutes to 18 minutes | Manual operation |
| 18 minutes to 20 minutes | Move to a |

| Bag-shopping scenario α ||
| --- | --- |
| Elapsed time | Action contents |
| 0 minutes to 20 minutes | Sales-floor-A scenario(1) |
| 20 minutes to 21 minutes | Move to sales-floor G |
| 21 minutes to 40 minutes | Sales-floor-G scenario (1) |

| Sales-floor-A scenario (1) ||
|---|---|
| Elapsed time | Action contents |
| 0 minutes to 1 minute | Move to a5 |
| 1 minute to 2 minutes | Move to a3 |
| 2 minutes to 3 minutes | Move to a2 |
| 4 minutes to 18 minutes | Manual operation |
| 18 minutes to 20 minutes | Move to a |

FIG. 7

| Bag-shopping scenario β ||
|---|---|
| Elapsed time | Action contents |
| 0 minutes to 5 minutes | Sales-floor-A scenario (2) |
| 5 minutes to 6 minutes | Move to Sales-floor G |
| 6 minutes to 12 minutes | Sales-floor-G scenario (2) |
| 12 minutes to 13 minutes | Standby (Select scenario) |
| 13 minutes to 14 minutes | Move to Sales-floor A |
| 14 minutes to 45 minutes | Sales-floor-A scenario (3) |

FIG. 8

| Elapsed time | Action contents |
|---|---|
| 0 minutes to 30 minutes | Sales-floor-B scenario |
| 30 minutes to 32 minutes | Move to Sales-floor E |
| 32 minutes to 60 minutes | Sales-floor-E scenario |

ROBOT CONTROL APPARATUS, ROBOT CONTROL METHOD, AND ROBOT CONTROL SYSTEM

CROSS-REFERENCE TO RELATED APPLICATIONS

The present application is a continuation application of International Application number PCT/JP2019/034796, filed on Sep. 4, 2019, which claims priority under 35 U.S.C § 119(a) to Japanese Patent Application No. 2018-168601, filed on Sep. 10, 2018. The contents of these applications are incorporated herein by reference in their entirety.

BACKGROUND

Technical Field

The present disclosure relates to a robot control apparatus, a robot control method, and a robot control system for controlling a robot that operates on the basis of a scenario.

Techniques for moving a robot on the basis of a predetermined task scenario are known. Japanese Unexamined Patent Application Publication No 2012-89174 discloses an information processing apparatus used for monitoring whether or not a robot is moving along a path indicated by a task scenario.

A single task scenario for executing a task using a robot is stored in a conventional information processing apparatus. When a task to be performed by a user who operates the robot is determined in advance, the task can be performed using the single task scenario stored in advance. However, when there are a plurality of types of tasks that may be performed by the user, there was an issue that there may be a task that cannot be executed even by using the single task scenario stored in advance.

SUMMARY

The present disclosure focuses on these points and its object is to enable operation of a robot on the basis of a scenario suitable for task contents.

A robot control apparatus according to a first aspect of the present disclosure includes a selection part that selects a scenario to be used, which an operator who operates a robot uses while operating the robot, from among a plurality of scenario candidates in which an elapsed time from a reference time and action contents of the robot are associated with each other; and a robot control part that controls the robot on the basis of the scenario to be used.

A robot control method according to a second aspect of the present disclosure includes the steps of selecting a scenario to be used which an operator who operates a robot uses while operating the robot from among a plurality of scenario candidates in which an elapsed time from a reference time and action contents of the robot are associated with each other; and controlling the robot on the basis of the scenario to be used.

A robot control system according to a third aspect of the present disclosure includes a robot, and a robot control apparatus that remotely controls the robot. The robot control apparatus has a selection part that selects a scenario to be used which an operator who operates the robot uses for operating the robot from among a plurality of scenario candidates in which an elapsed time from a reference time and action contents of the robot are associated with each other, and a robot control part that controls the robot on the basis of the scenario to be used, wherein the robot operates on the basis of the scenario to be used received from the robot control part.

BRIEF DESCRIPTION OF THE DRAWINGS

FIG. 7 shows a sales-floor-A scenario (1).
FIG. 8 shows a bag-shopping scenario β which is another example of the bag-shopping scenario.

DETAILED DESCRIPTION

Hereinafter, the present disclosure will be described through exemplary embodiments, but the following exemplary embodiments do not limit the disclosure according to the claims, and not all of the combinations of features described in the exemplary embodiments are necessarily essential to the solution means of the disclosure.

[Outline of a Robot Control System S]

Figure 1:
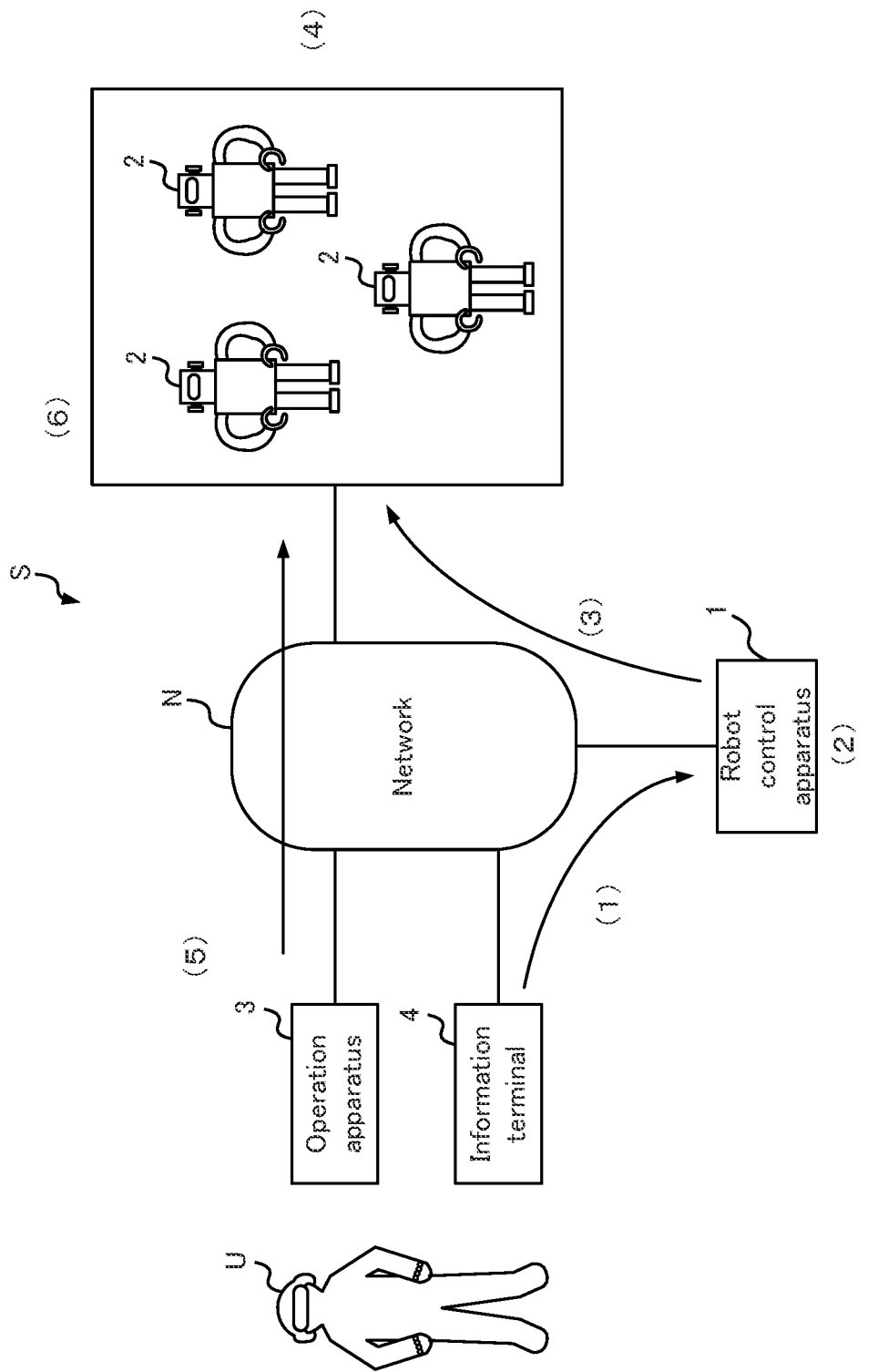
FIG. 1 shows an outline of a robot control system.

FIG. 1 shows an outline of a robot control system S. The robot control system S is a system that provides a telexistence environment in which a user operates an object or a person at a remote location in real time while making the user feel as if the object or the person is nearby.

The robot control system S includes a robot control apparatus 1, a robot 2, an operation apparatus 3, and an information terminal 4. In the robot control system S, the robot control apparatus 1 selects a scenario which will be used (hereinafter, this may be referred to as a "scenario to be used") from a plurality of candidates for scenarios (hereinafter, this may be referred to as "scenario candidates") to be used for operating the robot 2, and operates the robot 2 on the basis of the scenario to be used. The scenario is information in which (i) an elapsed time from a reference time and (ii) action contents of the robot 2 are associated with each other. The reference time is, for example, the time when the robot 2 starts an action, but is not limited thereto, and may be other times such as the time when a user who operates the robot 2 has performed a predetermined operation.

The robot control apparatus 1 is a computer that executes a process of selecting the scenario to be used and controlling the robot 2 on the basis of the selected scenario to be used. The robot control apparatus 1 operates the robot 2 by transmitting robot control information to the robot 2 via a network N. The robot control information is information indicating action contents to be executed by the robot 2, and the information is, for example, a direction of moving the robot 2, a speed of moving the robot 2, or a part that the robot 2 moves. The network N includes, for example, the Internet and cellular networks. The robot control apparatus 1 can control a plurality of robots 2 via the network N.

The robot 2 is a device that operates on the basis of the robot control information received from the robot control apparatus 1 or the operation apparatus 3 via the network N. In an example shown in FIG. 1, the robot 2 has a head part, an arm part, a leg part, and the like similar to a human, and each part operates following body movement of an operator U who operates the robot 2. The robot 2 is equipped with an imaging element and various types of sensors, and transmits, to the operation apparatus 3, a captured image generated by the imaging element and perceptual information such as temperature, vibration, and pressure detected by the sensors.

The operation apparatus 3 is a device for the operator U to control the robot 2. The operation apparatus 3 includes an operation instrument worn by the operator U and a cockpit including a communication unit that notifies the robot 2 of a state of the operation instrument of the operator U. The operation apparatus 3 identifies a movement of the operator U wearing the operation instrument and transmits a signal indicating the identified movement to the robot control apparatus 1 and the robot 2. In the operation apparatus 3, for example, the cockpit identifies the movement of the operator U on the basis of the signal received from the sensors of the operation instrument worn by the operator U. The cockpit may radiate infrared light to the operator U and identify the movement of the operator U on the basis of a reflected light of the irradiated infrared light.

Further, the operation apparatus 3 may notify the operation instrument worn by the operator U of the captured image and the perceptual information received from the robot 2 via the network N. The captured image is displayed to a display of goggles included in the operation instrument to be worn by the operator U. Each operation instrument the operator U attaches to his/her hands, feet, arms, or the like changes temperature or vibrates on the basis of the perceptual information. Due to such configurations, the operator U can experience the surrounding environment of the robot 2 in a place away from the robot 2 with a feeling as if he/she is in the robot 2.

The information terminal 4 is an electronic device used by the operator U, and is, for example, a smartphone or a tablet. The information terminal 4 includes a display for displaying information and an operation device for accepting input of an operation. The information terminal 4 notifies the robot control apparatus 1 of contents of the operation input to the operation device via the network N. The information terminal 4 may accept an operation by persons other than the operator U.

Hereinafter, an outline of how the robot control system S operates will be described while referencing FIG. 1. First, the operator U inputs a purpose of using the robot 2 to the information terminal 4. As will be described in detail below, the information terminal 4 displays, for example, a plurality of purpose candidates, and the operator U inputs his/her purpose to the information terminal 4 by selecting a desired purpose candidate from among the plurality of displayed candidate purposes. The information terminal 4 transmits object information indicating the input purpose to the robot control apparatus 1 ((1) in FIG. 1).

The robot control apparatus 1 selects, as a scenario to be used, one or more scenario candidates from among a plurality of scenario candidates on the basis of the received object information ((2) in FIG. 1). The robot control apparatus 1 controls the robot 2 on the basis of the selected scenario to be used. Specifically, the robot control apparatus 1 controls the robot 2 by transmitting the robot control information corresponding to the scenario to be used to the robot 2 at a timing corresponding to the scenario to be used ((3) in FIG. 1). The robot control apparatus 1 may operate the robot 2 by transmitting the scenario to be used itself to the robot 2.

The robot 2 starts actions when the robot 2 receives the robot control information from the robot control apparatus 1 ((4) in FIG. 1). After receiving the robot control information from the robot control apparatus 1, the robot 2 can also perform actions according to operation instructions transmitted from the operation apparatus 3. As an example, the robot 2 performs the actions in accordance with an operation of the operation apparatus 3 during a period in which actions caused by the operation on the operation apparatus 3 are permitted in the scenario to be used. When the operation apparatus 3 transmits the operation instructions during this period ((5) in FIG. 1), the robot 2 performs the actions in accordance with the operation instructions received from the operation apparatus 3 ((6) in FIG. 1). Hereinafter, a configuration and operation of the robot control apparatus 1 will be described in detail.

[Functional Configuration of the Robot Control Apparatus 1]

Figure 2:
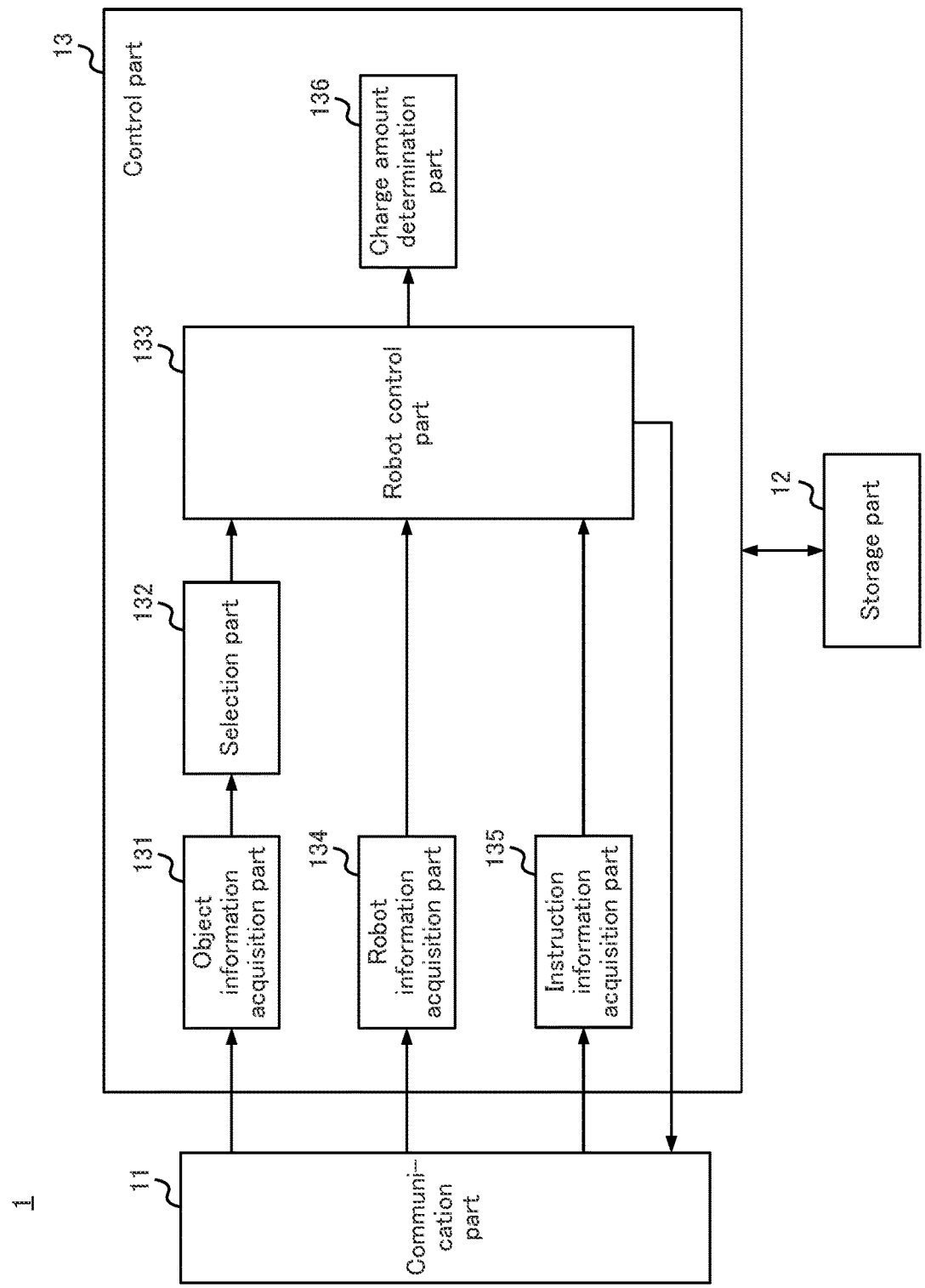
FIG. 2 shows a functional configuration of a robot control apparatus.

FIG. 2 shows a functional configuration of the robot control apparatus 1. The robot control apparatus 1 includes a communication part 11, a storage part 12, and a control part 13. The control part 13 includes an object information acquisition part 131, a selection part 132, a robot control part 133, a robot information acquisition part 134, an instruction information acquisition part 135, and a charge amount determination part 136.

The communication part 11 is a communication interface for transmitting and receiving data via the network N, and includes, for example, a local area network (LAN) controller. The communication part 11 inputs the object information received from the information terminal 4 to the object information acquisition part 131. The communication part 11 inputs robot information indicating a state of the robot 2 received from the robot 2 to the robot information acquisition part 134. The communication part 11 transmits the robot control information input from the robot control part 133 to the robot 2.

The storage part 12 includes a storage medium such as a read only memory (ROM), a random access memory (RAM), and a hard disk. The storage part 12 stores programs to be executed by the control part 13. Also, the storage part 12 stores the plurality of scenario candidates. The storage part 12 stores, for example, a candidate scenario created in an external device or a candidate scenario created using an operation part (not shown) of the robot control apparatus 1.

Also, the storage part 12 stores information about a plurality of the operators U who are registered in advance. The storage part 12 stores scenario candidates which the operator U selected in the past, the skill of the operator U in operating the robot 2, and the like in association with identification information for identifying the operator U, for example. The storage part 12 may store the operator U's skill in association with the types of the robot 2.

The control part 13 includes, for example, a central processing unit (CPU). The control part 13 functions as the object information acquisition part 131, the selection part 132, the robot control part 133, the robot information acquisition part 134, the instruction information acquisition part 135, and the charge amount determination part 136 by executing the programs stored in the storage part 12.

(Selection of the Scenario to be Used)

The object information acquisition part 131 acquires, via the communication part 11, object information indicating a purpose of the operator U for using the robot 2. The object information acquisition part 131 acquires the object information from the information terminal 4, for example, and may also acquire the object information from the operation apparatus 3 or another terminal. The object information acquisition part 131 notifies the acquired object information to the selection part 132.

The object information acquisition part 131 acquires object information indicating one or more purpose candidates selected from among the plurality of purpose candidates by displaying, for example, the plurality of purpose candidates on the information terminal 4. The purpose candidates are events he/she wants to do such as "Go shopping," "Play on a game machine," and "Do sightseeing" which the operator U makes the robot 2 do on his/her behalf.

The object information acquisition part 131 may acquire the object information through other servers. The object information acquisition part 131 acquires object information indicating the purpose selected by the operator U from, for example, a website of an event organizer from their web server.

Figure 3A:
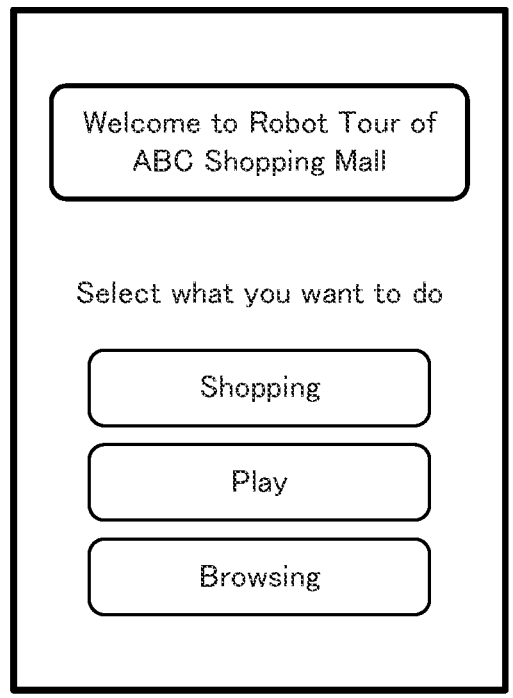
FIGS. 3A and 3B are each an example of a screen displayed on an informational terminal for an operator U to select his/her purpose.
Figure 3B:
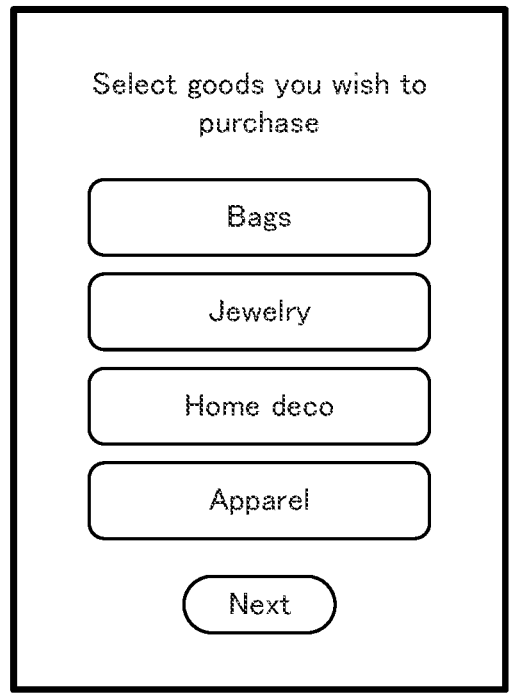

FIGS. 3A and 3B are each an example of a screen displayed on the information terminal 4 for the operator U to select his/her purpose. FIG. 3A is a website of ABC Shopping Mall and displays "Shopping," "Play," and "Browsing" as a plurality of purpose candidates. When the operator U selects "Shopping," he/she jumps to a screen of FIG. 3B, and a screen for the operator U to select the types of goods he/she wants to purchase is displayed. In this manner, goods to be purchased may also be one type of the purpose. Further, the information terminal 4 may display a shop name or a brand name so that the operator U can select a shop or a brand at which he/she does his/her shopping using the robot 2. In addition, the information terminal 4 may be configured to set the time when the operator U uses the robot 2. These items may also be one type of the purpose.

Returning to FIG. 2, the selection part 132 will be described. The selection part 132 selects a scenario to be used which will be used while the operator U who operates the robot 2 is operating the robot 2, from among a plurality of scenario candidates in which (i) the elapsed time since the robot 2 has started the action and (ii) action contents of the robot 2 are associated with each other. The selection part 132 selects the scenario to be used on the basis of, for example, the purpose indicated by the object information input from the object information acquisition part 131. The scenario is information defining how the robot 2 performs actions, and includes at least one of a position of the robot 2 or a movement of each part of the robot 2 in association with the elapsed time since the robot 2 has started the actions.

When there are a plurality of scenario candidates for the same purpose, the selection part 132 may present one or more scenario candidates selected from among the plurality of scenario candidates to the operator U, and may select, as the scenario to be used, the scenario candidate selected by the operator U from among the one or more scenario candidates. For example, when the operator U wants to go shopping for bags in ABC Shopping Mall, it is assumed that the operator U wants to select a sales floor to go shopping at from among a plurality of sales floors for bags in ABC Shopping Mall. It is also assumed that the operator U wants to select a shopping time. Therefore, the selection part 132 may present the plurality of scenario candidates to the operator U by causing the information terminal 4 to display options such as a destination of the robot 2, a time spent at each destination, contents of the action at each destination, and the like, and may use, as the scenario to be used, a scenario candidate corresponding to the options the operator U has selected. The selection part 132 may display a screen for inputting an additional purpose to the information terminal 4 to enable inputting of the additional purpose for filtering out some of the plurality of scenario candidates.

When presenting the plurality of scenario candidates to the operator U, the selection part 132 may present one or more scenario candidates to the operator U in an order based on the priorities of the plurality of scenario candidates determined on the basis of the scenario candidates selected by the operator U in the past. For example, the selection part 132 causes the storage part 12 to store a selection history in which one or more scenarios selected by the operator U are associated with the identification information of the operator U, and causes the information terminal 4 to display the plurality of scenario candidates in descending order of frequency of the scenario candidates selected by the operator U, by referencing the selection history. The selection part 132 may cause the storage part 12 to store the scenarios selected by the operator U in association with a season or a time period, and may cause the information terminal 4 to display the plurality of scenario candidates in descending order of frequency of the scenario candidates used in the past in the season or the time period in which the operator U intends to use the robot 2. Furthermore, the selection part 132 may cause the information terminal 4 to display the plurality of scenario candidates in an order of what has been most selected (i.e., by popularity) by a plurality of other operators U whose ages, preferences, or the like are similar to those of the operator U.

The selection part 132 may present one or more scenario candidates to the operator U in an order based on the priorities of a plurality of scenario candidates determined by the operator on the basis of the skill of operating the robot 2. The selection part 132 selects a scenario candidate suitable for the operator U's skill, for example, by referencing the operator U's skill stored in the storage part 12 and causes the information terminal 4 to display the selected scenario candidate.

The selection part 132 may select the types of the robot 2 on the basis of the object information, and select a candidate scenario on the basis of a skill of an operator U who operates the robot 2 of the selected type. In a case where the operator U's skill is low, the selection part 132 selects, for example, a candidate scenario in which the place or time for the operator U to freely operate is limited compared to a case where the operator U's skill is high. The selection part 132 selects the candidate scenario in consideration of the operator U's skill, and this reduces the risk of harming people or objects around the robot 2 due to improper operation of the operator U. Further, on a condition that the skill of the operator U is above a specified level, the selection part 132 may select a scenario in which the operator U manually operates the robot 2 freely for the entire times he/she uses the robot 2, or may select a scenario the operator U created by himself/herself.

Figure 4:
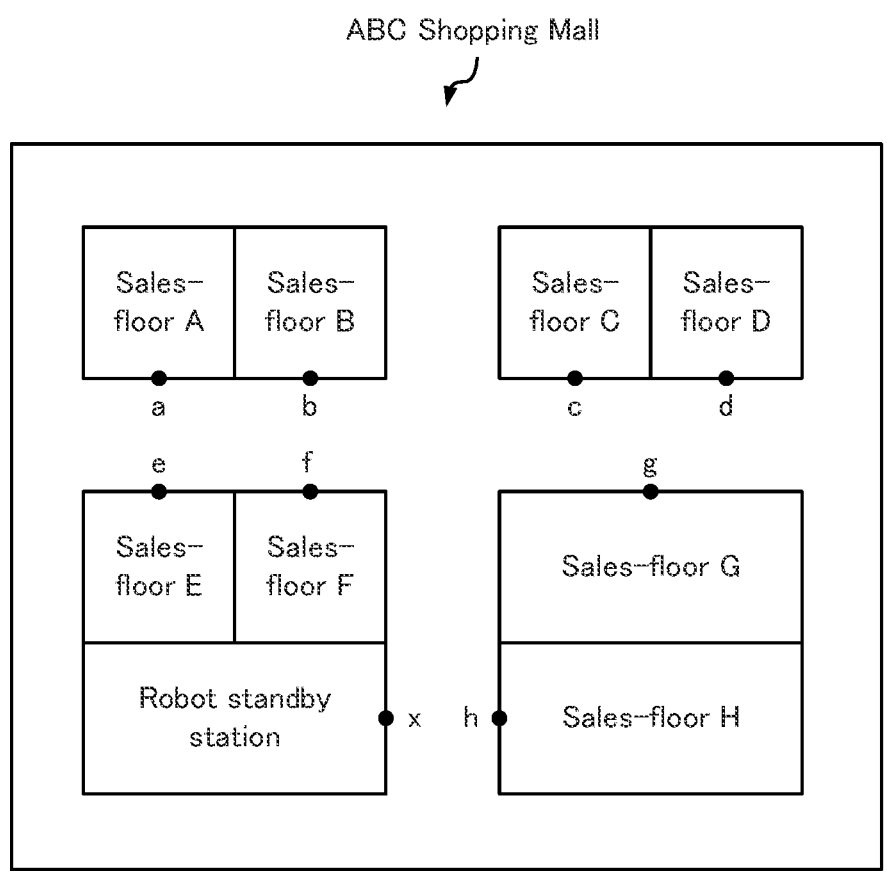
FIG. 4 is the layout of ABC Shopping Mall which is an exemplary store where a robot is used.
Figures 5, 6:
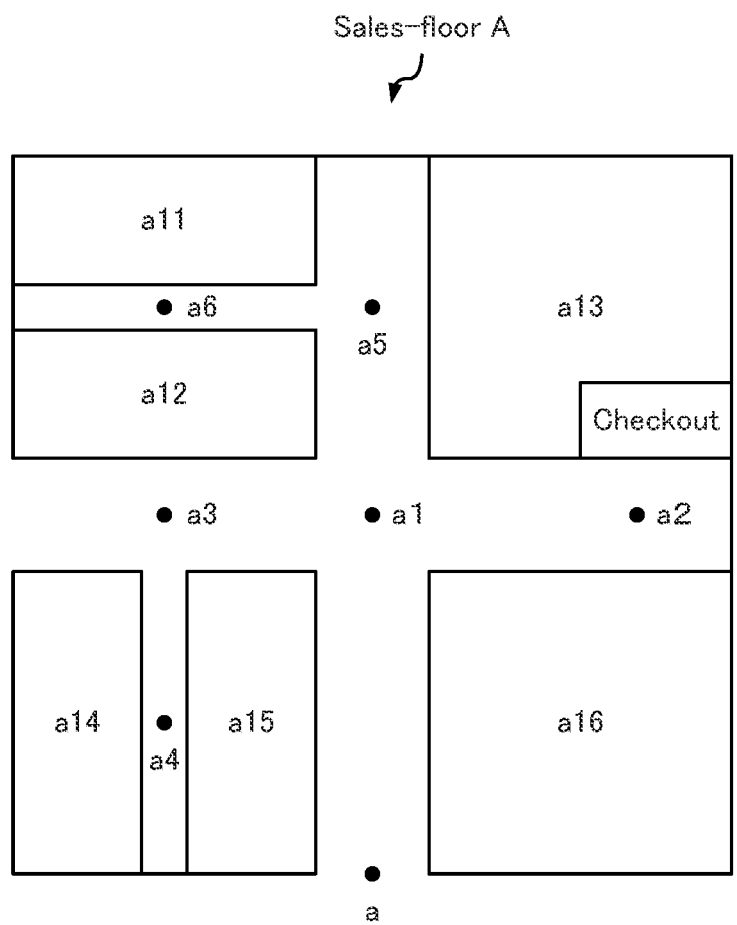
FIG. 5 is the layout of a sales floor A in ABC Shopping Mall.
FIG. 6 shows a bag-shopping scenario α which is a type of scenario.

FIG. 4 to FIG. 8 each illustrate a scenario. FIG. 4 is the layout of ABC Shopping Mall which is an exemplary store where the robot 2 is used. FIG. 5 is the layout of a sales floor A in ABC Shopping Mall.

FIG. 6 shows a bag-shopping scenario α, which is a type of scenario. The selection part 132 selects the bag-shopping scenario α shown in FIG. 6 upon acquiring the object information indicating a purpose of "buying a bag in ABC Shopping Mall" from the object information acquisition part 131. In the bag-shopping scenario α, other scenarios are linked to the action contents for some time periods (0 minutes to 20 minutes, 21 minutes to 40 minutes). In the following description, those other scenarios defined in the scenario may be referred to as sub-scenarios.

In the bag-shopping scenario α, it is defined that the robot 2 performs actions on the basis of a sales-floor-A scenario (1) which is a sub-scenario during the time interval from 0 minutes to 20 minutes, moves from the sales floor A (a position "a" in FIG. 4) to the sales floor G (a position "g" in FIG. 4) during the time interval from 20 minutes to 21 minutes, and performs actions on the basis of a sales-floor-G scenario (1) which is a sub-scenario during the time interval from 21 minutes to 40 minutes. In this example, it is assumed that the sales floor A and the sales floor G are shops that sell bags.

FIG. 7 shows the sales-floor-A scenario (1). In the sales-floor-A scenario (1), a point in time at which the robot 2 arrives at a position "a" in FIG. 4 is set to 0 minutes. In the sales-floor-A scenario (1), it is defined that after the robot 2 automatically moves so that the operator U can check the entire state of the sales floor A during the time interval from 0 minutes to 3 minutes, the operator U can freely move the robot 2 within the sales floor A by his/her own operation. While the robot 2 performs actions in accordance with the operation of the operator U, it is assumed that the operator U can check the goods with an image captured by a camera mounted on the robot 2, communicate with a sales clerk through a speaker and a microphone mounted on the robot 2, and touch the goods by moving a hand of the robot 2.

The hand of the robot 2 is provided with a perceptual sensor capable of detecting a vibration, pressure, temperature, or the like, and the perceptual information output by the perceptual sensor is transmitted to the operation apparatus 3 via the network N. The operation instrument worn by the operator U changes its state on the basis of the perceptual information received via the operation apparatus 3, and this enables the operator U to feel as if he/she is touching the goods.

FIG. 8 shows a bag-shopping scenario β, which is another example of a bag-shopping scenario. The bag-shopping scenario α shown in FIG. 6 is a scenario for shopping for about 20 minutes at the respective sales floors A and G. On the other hand, the bag-shopping scenario β is a scenario for browsing and having a look at the respective sales floors A and B for about 5 minutes first and then selecting which of the sales floors to go to, and shopping at the selected sales floor for about 30 minutes.

The selection part 132 causes the information terminal 4 to display a screen for selecting one of the sales floor A and the sales floor G via the object information acquisition part 131, for example, at a point in time when the elapsed time is 12 minutes. Upon acquiring object information indicating the sales floor selected by the operator U, the selection part 132 selects a sub-scenario for the sales floor indicated by the acquired object information. In this manner, the selection part 132 may select a sub-scenario selected in the information terminal 4 while being operated by the operator U on the basis of a certain scenario.

Figures 9, 10:
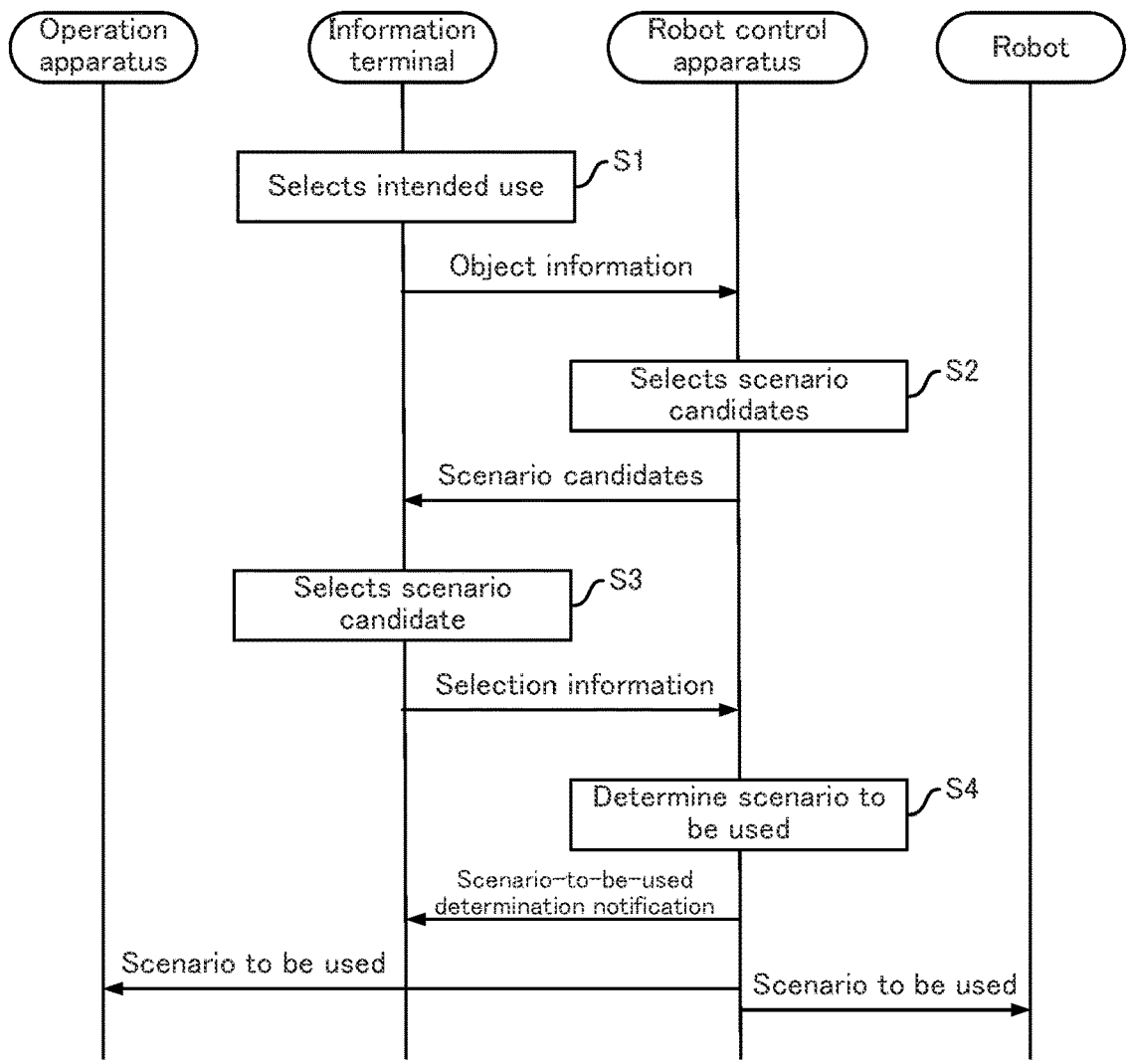
FIG. 9 shows a jewelry-shopping scenario α to be selected when object information indicates jewelry shopping.
FIG. 10 shows an operation sequence of a robot control system.

FIG. 9 shows a jewelry-shopping scenario α to be selected when object information indicates jewelry shopping. The jewelry-shopping scenario α is the same as the bag-shopping scenario α shown in FIG. 6 in that it is a scenario for shopping at a plurality of sales floors, and is different from the bag-shopping scenario α in the points that (i) the sales floors to visit are sales floors B and E and (ii) the time spent at each of the sales floors is approximately 30 minutes. n this manner, the selection part 132 can select the scenario to be used from various scenarios in which the robot 2's destination, moving time, and action contents are different.

In the above explanation, the process in which the selection part 132 selects one or more scenarios to be used from the plurality of scenarios has been described, but the selection part 132 may select a robot for the operator U to use from among the plurality of robots 2 on the basis of the purpose. The selection part 132 selects, as the robot to be used, a robot 2 suitable for the purpose from, for example, a list of the plurality of robots 2 stored in the storage part 12. The list of robots 2 includes, in association with identification information of the robot 2, a standby place where the robot 2 is located, types of actions executable by the robot 2, a date and time when the robot 2 is reserved, or the like. In the list of robots 2, the identification information of the robots 2 and identification information of usable scenarios may be associated with each other.

When the purpose of the operator U is to go shopping in ABC Shopping Mall, the selection part 132 selects the robot 2 whose standby place is ABC Shopping Mall, whose types of actions are for shopping, and which is not reserved by other operators U at the date and time that the operator U wants to use the robot 2. The selection part 132 notifies the robot control part 133 of the identification information of the selected robot 2. It should be noted that the selection part 132 may select, depending on a reservation status of the plurality of robots 2, two or more robots to be used. For example, the selection part 132 selects the robots 2 such that one robot is to be used in the sales floor B and another robot to be used in the sales floor E in the example of FIG. 9, and this makes it possible to use the time that would be spent moving between the sales floors as shopping time instead.

(Control of the Robot 2 Based on the Scenario to be Used)

Returning to FIG. 2, the robot control part 133 will be described. The robot control part 133 controls the robot 2 on the basis of the scenario to be used selected by the selection part 132. The robot control part 133 controls the robot 2 by, for example, transmitting the robot control information to the robot 2 selected by the selection part 132 at the timing corresponding to the scenario to be used. Specifically, the robot control part 133 transmits the robot control information to the robot 2 at each elapsed time of the scenarios exemplified in FIG. 6 to FIG. 9 to cause the robot 2 to execute the action contents defined in association with the elapsed time.

The robot control part 133 starts the action of the robot 2 based on the scenario to be used after the instruction information acquisition part 135, which acquires instruction information transmitted from the operation apparatus 3 to the robot control apparatus 1 or the robot 2, acquires instruction information indicating that operation of the robot 2 is to start from the operation apparatus 3 which accepts the operation of the operator U. For example, when the operation apparatus 3 transmits an operation start instruction to the robot 2 upon the operator U putting on the operation instrument and making a predetermined movement that indicates that he/she is ready to operate the robot 2, the robot control part 133 transmits, in response to detecting the operation start instruction, robot control information for moving the robot 2 from a robot standby station to the position "a" of the sales floor A to the robot 2.

As shown in the sales-floor-A scenario (1) of FIG. 7, the robot control part 133 may switch, on the basis of the scenario to be used, between (i) a manual operation period in which the robot 2 is operated in accordance with the operation of the operator U and (ii) an automatic operation period in which the robot control part 133 operates the robot 2. The robot control part 133 transmits, to the robot 2, robot control information which prohibits operating in response to the operation instruction from the operation apparatus 3 during the automatic operation period, and transmits, to the robot 2, robot control information which permits operating in response to the operation instruction from the operation apparatus 3 at a timing when the manual operation period starts. The robot control part 133 switches between the manual operation period and the automatic operation period in this manner, thereby reducing the risk of harming other people in the path where many people move along due to the operator U's improper operation, and allowing the operator U to freely enjoy shopping in the sales floor. It should be noted that the scenario may include a semi-automatic operation period in which only some functions are manually operable, and the robot control part 133 may allow only some functions of the robot 2 to be manually operable during the semi-automatic operation period.

The robot control part 133 may identify a place where the robot 2 performs actions on the basis of the scenario to be used, and may set a period as the automatic operation period when the identified place is included in a manual operation prohibition area, and set a period as the manual operation period when the identified place is included in a manual operation permission area. When the selection part 132 selects the bag-shopping scenario α of FIG. 6, since the robot 2 is in the path that is defined to be the manual operation prohibition area while moving to the sales floor G, the robot control part 133 sets this period as the automatic operation period.

The robot control part 133 may also start the manual operation period after moving the robot 2 to a predetermined place on the basis of the scenario to be used. In the case of the bag-shopping scenario α shown in FIG. 6, in order to start the operations based on the sales-floor-A scenario (1), the robot control part 133 transmits the robot control information including an instruction of moving to the position "a", which is an entrance to the sales floor A, to the robot 2 selected by the selection part 132 from among the plurality of robots 2 waiting in the robot standby station shown in FIG. 4. Thereafter, the robot control part 133 moves the selected robot 2 to the position a2 in the sales floor A on the basis of the sales-floor-A scenario (1) shown in FIG. 7 first and then starts the manual operation period, and transmits robot control information for permitting the robot 2 to accept the operation instruction of the operator U. Since the robot 2 is moved to the predetermined place before the robot control part 133 starts the manual operation period in this manner, the operator U can operate the robot 2 in a safe place.

(Presentation of the Operation Guide to the Operator U)

The robot control part 133 may output operation guide information including information for guiding an operation method of the robot 2 to the operation apparatus 3 which accepts the operation of the operator U while the operator U operates the robot 2 using the operation apparatus 3. For example, the robot control part 133 provides the operator U with the operation guide information based on the action contents indicated by the scenario associated with the elapsed time corresponding to the time when the operator U is operating the robot 2. Specifically, the robot control part 133 transmits the operation guide information to the operation apparatus 3, thereby displaying the operation guide information on the goggles that the operator U has worn. Since the robot control part 133 transmits the operation guide information to the operation apparatus 3 in this manner, the operator U can perform an appropriate operation, and this enables the operator U to easily operate the robot 2 within allotted time periods determined in the scenario.

Also, by linking with the robot information acquisition part 134, the robot control part 133 may transmit, to the operation apparatus 3 or the information terminal 4, the operation guide information for the operator U to perform the appropriate operation. The robot information acquisition part 134 acquires the robot information indicating the state of the robot 2. The robot information acquisition part 134 acquires, as the robot information, for example, at least one of (i) information indicating a position of the robot 2, (ii) information indicating a speed at which the robot 2 is moving, (iii) information indicating a direction in which the robot 2 is moving, or (iv) information indicating a movement of each part of the robot 2. The robot information acquisition part 134 notifies the robot control part 133 of the acquired robot information.

The robot control part 133 outputs predetermined operation guide information when the state of the robot 2 indicated by the robot information acquired by the robot information acquisition part 134 does not correspond to the action contents of the scenario to be used associated with the elapsed time at a point in time when the robot information acquisition part 134 acquired the robot information. The robot control part 133 notifies the operator U of the operation guide information for enabling the operator U to execute the action contents defined in the scenario, for instance when the operator U is performing the operation on the basis of the sales-floor-A scenario (1) shown in FIG. 7 and the robot 2 is at a place far from the position "a" despite the elapsed time being 15 minutes, the robot control part 133 provides notification of "Please finish shopping in two minutes". Since the robot control part 133 operates in this manner, the operator U finishes using the robot 2 at a scheduled time on the basis of the scenario, and the next person who reserved the robot 2 can start using the robot 2 as scheduled. The robot control part 133 may accept a change of scenario such as an extension of the shopping time on the condition that the next reservation for the robot 2 is not made, or may further accept a change of scenario for shortening the shopping time when the shopping is finished earlier than scheduled.

The robot control part 133 may output the operation guide information after a predetermined delay time has passed since detecting that the state of the robot 2 indicated by the robot information does not correspond to the action contents associated with the elapsed time at a point in time when the robot information acquisition part 134 acquired the robot information. The predetermined delay time is, for example, a time required for the robot control part 133 to determine whether or not the operator U is about to return to the state corresponding to the action contents, and is determined on the basis of the length of the remaining manual operation period.

The longer the remaining manual operation period, the more the robot control part 133 lengthens the delay time, and the shorter the remaining manual operation period, the more the robot control part 133 shortens the delay time. Since the control part 133 outputs the operation guide information after the delay time has elapsed in this manner, interfering with the operation of the operator U due to notifying the operator U of the operation guide information even though he/she is aware of a deviation from the scenario can be avoided.

When the operation of the operator does not correspond to the action contents of the scenario to be used associated with the elapsed time at a point in time when the robot information acquisition part 134 acquired the robot information, the robot control part 133 may output operation guide information including information for confirming whether or not the state of the robot 2 stops the action of the robot 2 based on the scenario to be used to the operation apparatus 3 which accepts the operation of the operator U. The robot control part 133 notifies the operator U of a message for confirming whether or not to make the action contents different from the action contents defined in the scenario to be used, for instance when the operator U is performing the operation on the basis of the sales-floor-A scenario (1) shown in FIG. 7 and when the robot 2 is at a place far from the position "a" despite the elapsed time being 15 minutes, the robot control part 133 provides notification of "Do you wish to extend the shopping time?"

The robot control part 133 can also acquire the operator U's instruction of whether or not to stop the action of the robot 2 based on the scenario to be used from the operation apparatus 3 via the instruction information acquisition part 135 that acquires the instruction information transmitted from the operation apparatus 3 to the robot control apparatus 1 or the robot 2. Upon receiving the instruction to stop the action of the robot 2 based on the scenario to be used from the operation apparatus 3, the control part 133 transmits the robot control information for instructing stoppage of the action based on the scenario to be used to the robot 2.

When the instruction information acquisition part 135 acquires instruction information for stopping the action of the robot 2 based on the scenario to be used from the operator U via the operation apparatus 3, the robot control part 133 causes the storage part 12 to store the elapsed time since stopping the action of the robot 2 in the scenario to be used in association with operator identification information for identifying the operator U. Then, when the instruction information acquisition part 135 acquires instruction information for resuming the action of the robot 2 based on the scenario to be used from the operator U, the robot control part 133 resumes the action of the robot 2 from the action contents corresponding to the elapsed time at which the action of the robot 2 was stopped in the scenario to be used. Since the robot control part 133 operates in this manner, it is possible to limit a period during which the robot 2 executes the action contents that differ from those of the scenario to be used, and therefore negative influences on people around the robot 2 can be reduced. In addition, if the operator U needs to pause the action of the robot 2 partway through the scenario to be used due to an urgent matter, the robot control part 133 can resume the action of the robot 2 at a later date from partway through the scenario to be used.

When the instruction information acquisition part 135 acquires the instruction information for stopping the action of the robot 2 from the operator U, the robot control part 133 may cause the storage part 12 to store a stop position, which is a position of the robot 2 at the time when the action of the robot 2 was stopped, in association with the operator identification information for identifying the operator U. Then, the robot control part 133 may resume the action of the robot 2 from the stop position when the instruction information acquisition part 135 acquires the instruction information for resuming the action of the robot 2 based on the scenario to be used from the operator U. Since the robot control part 133 operates in this manner, even if temporarily switched to the manual operation, it is possible to operate the robot 2 based on the scenario thereafter.

It should be noted that upon stopping the action based on the scenario to be used or resuming the action based on the scenario to be used, the robot control part 133 may notify a predetermined contact address to that effect. For instance, if the time spent in the sales floor A become longer than what's been scheduled while executing the scenario to be used for moving to the sales floor G after the sales floor A, the robot control part 133 notifies an information terminal of a sales clerk of the sales floor G, which the robot 2 is scheduled to visit next, that its visit will be later than what's been scheduled. In this manner, the robot control part 133 can reduce negative influences caused by changing the scenario to be used.

(Link with a Sales-Floor Terminal)

The robot control part 133 may be linked with a sales-floor terminal (not shown) installed in an area where the robot 2 performs actions. The sales-floor terminal is an information terminal such as a smartphone or a tablet that can be operated by a sales clerk in a sales floor where the robot 2 performs action. For example, upon receiving an instruction to start the action of the robot 2 from the operator U, the robot control part 133 transmits a message requesting the start of the action of the robot 2 to the sales-floor terminal via the network N. The robot control part 133 transmits, for example, a request message including the action contents indicated by the scenario to be used to the sales-floor terminal. Information for accessing the sales-floor terminal is stored in the storage part 12, and the robot control part 133 transmits the message to the sales-floor terminal by referencing the information stored in the storage part 12.

Upon receiving the message, the sales-floor terminal displays, on a display, the time at which the robot 2 comes to a shop and the purpose for which the robot 2 comes to the shop, on the basis of the information included in the message. The robot control part 133 may transmit information about the operator U to the sales-floor terminal, and the sales-floor terminal may display the information about the operator U. The information about the operator U includes at least any one of (i) information related to the high probability of purchasing the goods, for example, the operator U's age, sex, actual purchasing results of the past, annual income, or the like or (ii) information related to the operator U's skill in operating the robot 2.

The sales-floor terminal displays, on the display, a screen for selecting whether to permit or refuse the robot 2's visit to the shop. The sales clerk who has checked the sales-floor terminal determines whether to permit or refuse the visit of the robot 2 operated by the operator U by making references to the time of the visit, the purpose of the visit, and the information related to the operator U, and inputs a result of this determination to the sales-floor terminal.

The robot control part 133 starts the action of the robot 2 based on the scenario to be used on a condition that permission is acquired from the sales-floor terminal. When a permission notification is acquired from the sales-floor terminal, the robot control part 133 transmits the robot control information instructing the robot 2 to start an action. Further, the robot control part 133 notifies the operation apparatus 3 that the starting of the action based on the scenario to be used has been permitted.

On the other hand, when a refusal notification is acquired from the sales-floor terminal, the robot control part 133 transmits the robot control information instructing the robot 2 to stop acting. The robot control part 133 also notifies the operation apparatus 3 that the starting of the action based on the scenario to be used has been refused.

When the refusal notification is acquired from the sales-floor terminal, the robot control part 133 may let the operator U reselect the scenario to be used by instructing the object information acquisition part 131. In this case, the robot control part 133 may cause the operator U to select another scenario candidate by transmitting, to the operation apparatus 3 or the information terminal 4 via the selection part 132, other scenario candidates in which there is no moving to the sales floor corresponding to the sales-floor terminal that transmitted the refusal notification.

The sales floor terminal may display a screen on a display for selecting whether the manual operation of the robot 2 by the operator U is permitted or not. The robot control part 133 transmits the robot control information including prohibition information for prohibiting the robot 2 from performing actions on the basis of the instruction transmitted from the operation apparatus 3, which accepts the operation from the operator U, when the robot 2 acquires, from the sales-floor terminal, a notification for refusing performing an action other than a predetermined action. The robot control part 133 notifies the operation apparatus 3 that conducting the manual operation has been rejected.

Since the robot control part 133 is linked with the sales-floor terminal in the above mentioned manner, it is possible to refuse the visit of the robot 2 in advance, for instance in a case such as when there are more shoppers than expected in a sales floor and it would be difficult for a sales clerk to sufficiently deal with the robot 2, and this consequently prevents causing inconvenience for sales staff in the sales floor or other shoppers, or cases where the operator U receives an unpleasant response from the sales staff in the sales floor which would have occurred had the robot 2 moved in the sales floor.

(Charging a Usage Fee of the Robot 2)

The robot control system S may have a function of charging the operator U for a usage fee of the robot 2. The charge amount determination part 136 determines a charge amount for the operator U on the basis of, for example, a combination of the scenario to be used selected by the selection part 132 and the robot 2 used by the operator U in addition to an occupancy time of using the robot 2. When a company that manages the robot 2 benefits from the operator U using the robot 2, such as a case where the scenario to be used is "Shopping" and the robot to be used is the robot 2 for shopping, the charge amount determination part 136 lowers the charge amount compared to other combinations of the scenario to be used and the robot to be used.

When the company managing the robot 2 does not benefit from the operator U using the robot 2, such as a case where the scenario to be used is "Sightseeing" and the robot to be used is the robot 2 for going sightseeing in a town, the charge amount determination part 136 increases the charge amount compared to other combinations of the scenario to be used and the robot to be used. In this manner, the operator U can use the robot 2 at an appropriate rate according to an intended use.

The charge amount determination part 136 may further determine the charge amount on the basis of a degree of matching between (i) the action contents of the robot to be used defined in the scenario to be used and (ii) the operation contents for the robot to be used carried out by the operator U. For instance, when the operator U is operating the robot 2 using the sales-floor-A scenario (1) shown in FIG. 7, the charge amount determination part 136 adds a charge amount if the robot 2 is not ready to be moved before the elapsed time becomes 20 minutes, and does not add any charge amount if the robot 2 is ready to be moved toward the position "a" at a point in time when the elapsed time is 20 minutes.

In this manner, the charge amount determination part 136 can motivate the operator U to operate in accordance with the scenario to be used by increasing the charge amount when the operator U performs an operation deviating from the scenario to be used. As a result, since the operator U is more likely to finish using the robot 2 at the scheduled time, it is possible to reduce the risk of causing inconvenience to an operator U who is scheduled to use the robot 2 next.

The charge amount determination part 136 may lower the charge amount in a case where a settlement process for purchasing the goods using the robot 2 is performed while the robot 2 is in action on the basis of the scenario to be used compared to a case where the settlement process is not performed while the robot 2 is in action on the basis of the scenario to be used. The robot 2 has, for example, a scanner for reading QR Codes (a registered trademark) in its hand, and upon reading the QR Code associated with the goods of the store, transmits code information included in the read QR Code to the robot control apparatus 1.

The charge amount determination part 136 identifies the price of the goods on the basis of the transmitted code information, and adds the identified price to a provisional invoice amount for the operator U. At this time, an amount calculated by subtracting a predetermined amount (for example, a discount amount determined on the basis of the price of the goods) from the provisional invoice amount calculated by adding the usage fee of the robot 2 to the price of the goods is determined as an amount to be invoiced to the operator U. The charge amount determination part 136 may settle the determined amount by transmitting it to an external server for a credit card settlement.

The charge amount determination part 136 may determine the charge amount on the basis of whether a store is in a relatively idle time period (e.g., day time on weekdays) or in a busy time period (e.g., holiday). For example, the charge amount determination part 136 makes the charge amount smaller for the time period in which the store is relatively idle than for the time period in which the store is busy. Since the charge amount determination part 136 operates in this manner, shopping by using the robot 2 in the time period in which the shop is relatively idle takes place more often, thereby making it possible to make the congestion level of the store uniform.

[Operation Sequence of the Robot Control System S]

Figure 11:
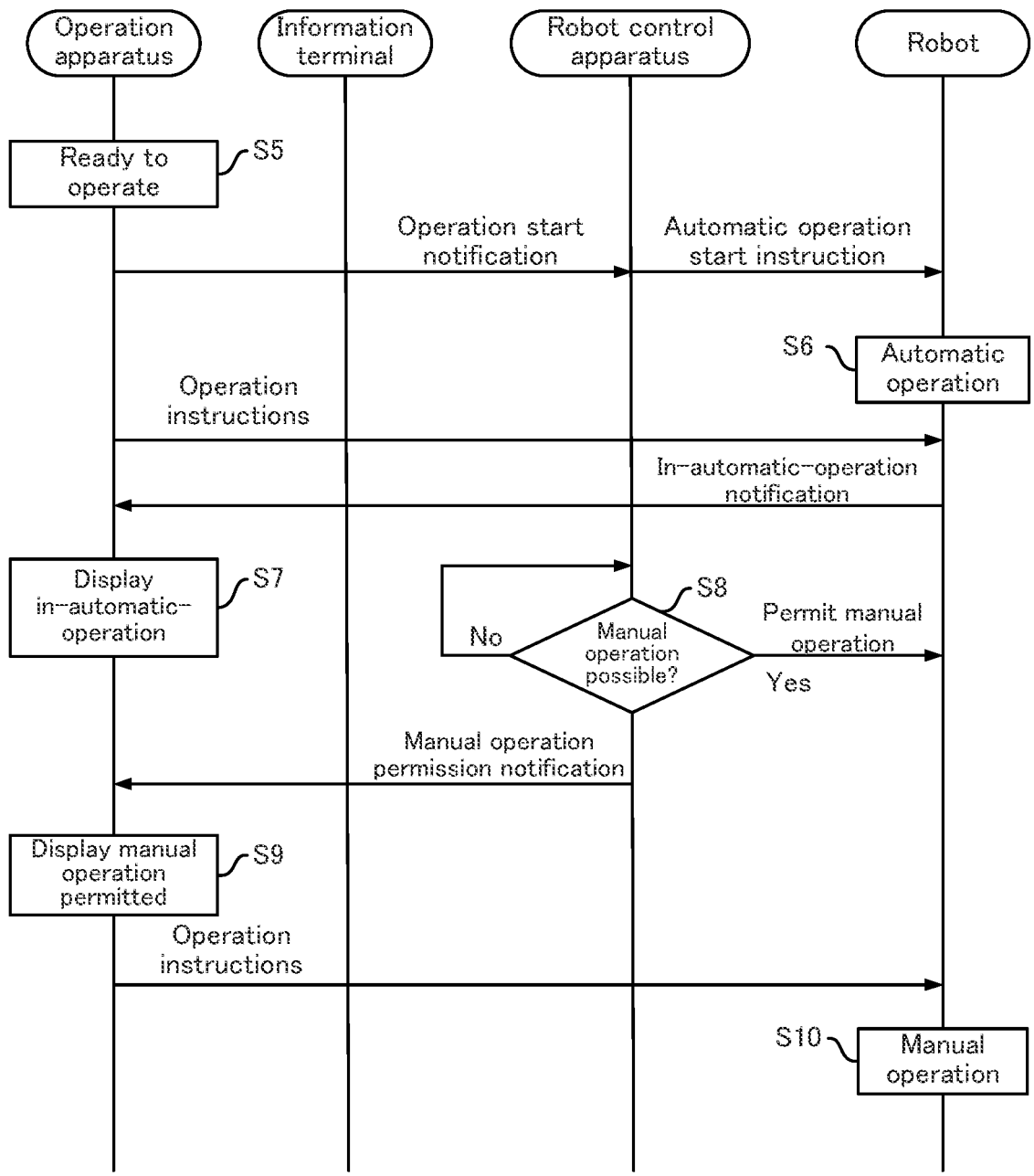
FIG. 11 shows an operation sequence of the robot control system.

FIG. 10 and FIG. 11 each show an operation sequence of the robot control system S. The sequence shown in FIG. 10 starts with an operation in which the operator U selects an intended use of the robot 2 in the information terminal 4 (S1). The information terminal 4 transmits object information indicating the selected intended use to the robot control apparatus 1. In the robot control apparatus 1, the selection part 132 selects a plurality of scenario candidates on the basis of the received object information (S2), and transmits the selected plurality of scenario candidates to the information terminal 4.

The operator U selects a desired scenario candidate from the plurality of scenario candidates displayed on the information terminal 4 (S3), and the information terminal 4 transmits selection information indicating the selected scenario candidate to the robot control apparatus 1. The selection part 132 determines the scenario candidate indicated by the received selection information as the scenario to be used (S4). The selection part 132 notifies the information terminal 4 that the scenario to be used has been determined. Thereafter, the selection part 132 transmits the content of the scenario to be used to the operation apparatus 3 and the robot 2.

Subsequently, in FIG. 11, when the operation apparatus 3 detects that the operator U is ready to operate the robot 2 (S5), the operation apparatus 3 transmits an operation start notification indicating that the operation of the robot 2 is started to the robot control apparatus 1. Upon receiving the operation start notification, the robot control apparatus 1 transmits an automatic operation start instruction to the robot 2 to start the action based on the scenario to be used to the robot 2. The robot 2 starts an automatic operation in response to the reception of the automatic operation start instruction (S6). For example, when the bag-shopping scenario α shown in FIG. 6 is used, the robot 2 automatically moves to the position "a", which is the entrance to the sales floor A.

Upon receiving the operation instruction from the operation apparatus 3 during the automatic operation, the robot 2 transmits an in-automatic-operation notification indicating that it is in the automatic operation to the operation apparatus 3. The operation apparatus 3 alerts the operator U not to repeat the same operation by displaying that an operation is not possible because the robot 2 is in the automatic operation (S7).

Thereafter, when a certain time has elapsed and the timing at which a manual operation can be performed in the scenario to be used is reached (YES in S8), the robot control part 133 of the robot control apparatus 1 transmits, to the robot 2, the robot control information that permits the manual operation. At this time, the robot control part 133 may transmit, to the operation apparatus 3, a manual operation permission notification indicating that the manual operation is permitted. The operation apparatus 3 that has received the manual operation permission notification displays that the manual operation is permitted (S9). When the robot 2 receives an operation instruction from the operation apparatus 3 after the manual operation is permitted, the robot 2 executes the manual operation on the basis of the instructed content (S10).

Variation Example

In the above explanation, the example where the robot 2 is used for the purpose of shopping has been described, but the purpose for which the robot 2 is used is not limited to this. Using a scenario for sightseeing of a desired place, the operator U can select a robot to be used from among the robots 2 arranged at a plurality of points, let the robot 2 be used to move about a city area or tourist spots, and enjoy sightseeing while being remote. The operator U can also select the robot to be used from among the robots 2 arranged in a plurality of workplaces using a scenario for doing desired work, and remotely operate the robot 2 to be used to do his/her work.

In the above explanation, the example where the robot control apparatus 1 has the object information acquisition part 131, the robot information acquisition part 134, the instruction information acquisition part 135, and the charge amount determination part 136 has been described, but the robot control apparatus 1 does not need to include these parts, and may include some of them. When the robot control apparatus 1 does not have the object information acquisition part 131, the selection part 132 selects the scenario candidate selected in the information terminal 4 as the scenario to be used.

In addition, the scenario described in the above description is merely an example, and various examples can be applied to the present disclosure. For example, instead of selecting the scenario to be used from the plurality of created scenarios, the selection part 132 may change the created scenario on the basis of an instruction acquired from the information terminal 4 or may create a new scenario. For example, the selection part 132 may change the time spent in the sales floor in the shopping scenario α to the time set by the operator U in the information terminal 4.

The selection part 132 may change the scenario while the robot 2 is in action on the basis of the scenario. For example, if the operator U finished shopping at a particular sales floor early and wishes to begin shopping at another sales floor, the robot control part 133 may skip the running scenario and start action of the robot 2 on the basis of the next scenario. In order to do this, the selection part 132 causes the operation apparatus 3 or the information terminal 4 to display a screen capable of performing a skipping operation, and notifies the robot control part 133 of a transition to the next scenario in response to the skipping operation being performed. The robot control part 133 starts the action of the robot 2 based on a post-transition scenario. Since the selection part 132 and the robot control part 133 operate in this manner, it is possible to cause the robot 2 to perform an action that correspond with the desire of the operator U who operates the robot 2 along the scenario.

Also, in the scenario described above, it is assumed that a single robot 2 operates on the basis of a single scenario, but a plurality of robots 2 may operate sequentially on the basis of a single scenario. For example, the robot 2 may be on standby at each sales floor of ABC Shopping Mall, and the operator U may shop using the respective robots 2 waiting at each sales floor. This eliminates the need for the moving time, such as the time for "Move to sales floor G" in the shopping scenarios a shown in FIG. 6, and therefore the operator U can perform tasks (e.g., shopping) in many locations in a short period of time.

When the operator U sequentially operates the plurality of robots 2, the robot control part 133 causes the operation apparatus 3 to present, for example, that the switching time has come at a point in time when the time to switch from a first robot 2 to a second robot 2 in the scenario comes. If a state of the first robot 2 is not in a predetermined state (e.g., a state of being returned to a predetermined position) at the switching time, the robot control part 133 may wait until the state of the first robot 2 becomes the predetermined state first and then switch such that the operator U can operate the second robot 2. Since the robot control part 133 operates in this manner, a problem such as the robot 2 stopping at an improper location in the sales floor, for example, can be avoided.

This sequential operation of the plurality of robots 2 is also suitable for the case where the robots 2 are used for sightseeing. For example, even when the operator U wants to go around a plurality of tourist spots using the robot 2, the operator U can go around the plurality of tourist spots in a short period of time by sequentially using the respective robots 2 installed in each of the plurality of tourist spots. However, it can also be assumed that the operator U wants to enjoy traveling time. Therefore, the selection part 132 may acquire information for selecting whether to use a single robot 2 or the plurality of robots 2 from the information terminal 4, and determine whether to use a scenario using a single robot 2 or a scenario using the plurality of robots 2 on the basis of the acquired information.

[Effects of the Robot Control System S]

As described above, in the robot control system S, the selection part 132 selects the scenario to be used from among the plurality of scenario candidates and the robot to be used from among the plurality of robots 2 on the basis of the purpose of the operator U to use the robot 2. Then, the robot control part 133 performs control to operate the robot 2 to be used on the basis of the selected scenario to be used. Since the robot control system S has such a function, the operator U himself/herself can achieve various types of purposes such as shopping, sightseeing, and doing his/her works using the robot 2 at a remote location.

The present disclosure is explained based on the exemplary embodiments. The technical scope of the present disclosure is not limited to the scope explained in the above embodiments and it is possible to make various changes and modifications within the scope of the disclosure. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

What is claimed is:

1. A robot control apparatus comprising:
   a selection part that selects a scenario to be used, which an operator who operates a robot uses while operating the robot, from among a plurality of scenario candidates in which an elapsed time from a reference time and action contents of the robot are associated with each other; and
   a robot control part that controls the robot on the basis of the scenario to be used,
   wherein the robot control part switches, on the basis of the scenario to be used, between (i) a manual operation period for operating the robot in accordance with an operation of the operator and (ii) an automatic operation period in which the robot control part operates the robot.

2. The robot control apparatus according to claim 1, wherein the robot control part starts the manual operation period after moving the robot to a predetermined place on the basis of the scenario to be used.

3. The robot control apparatus according to claim 1 further comprisinq:
   an object information acquisition part that acquires object information indicating a purpose of the operator for using the robot, wherein
   the selection part selects the scenario to be used on the basis of the purpose indicated by the purpose information.

4. The robot control apparatus according to claim 3, wherein the selection part selects a robot to be used by the operator from among a plurality of the robots on the basis of the purpose.

5. The robot control apparatus according to claim 4 further comprising
   a charge amount determination part that determines a charge amount for the operator on the basis of a combination of the scenario to be used and the robot to be used selected by the selection part.

6. The robot control apparatus according to claim 5, wherein the charge amount determination part determines the charge amount on the basis of a degree of matching between (i) action contents of the robot to be used defined in the scenario to be used and (ii) operation contents of the robot to be used carried out by the operator.

7. The robot control apparatus according to claim 1, wherein the selection part presents one or more scenario candidates selected from among the plurality of scenario candidates to the operator, and selects, as the scenario to be used, a scenario candidate which the operator has selected from among the one or more scenario candidates.

8. The robot control apparatus according to claim 7, wherein the selection part presents the one or more scenario candidates to the operator in an order based on priorities of the plurality of scenario candidates determined on the basis of scenario candidates selected by the operator in the past.

9. The robot control apparatus according to claim 7, wherein the selection part presents the one or more scenario candidates to the operator in an order based on priorities of the plurality of scenario candidates determined by the operator on the basis of skill of operating the robot.

10. The robot control apparatus according to claim 1 further comprising
    a robot information acquisition part that acquires robot information indicating a state of the robot, wherein
    the robot control part outputs predetermined guide information when the state of the robot indicated by the robot information acquired by the robot information acquisition part does not correspond to the action contents of the scenario to be used associated with the elapsed time at a point in time when the robot information acquisition part acquired the robot information.

11. The robot control apparatus according to claim 10, wherein the robot control part outputs the guide information after a predetermined delay time has passed since detecting that the state of the robot indicated by the robot information does not correspond to the action contents associated with the elapsed time at a point in time when the robot information acquisition part acquired the robot information.

12. The robot control apparatus according to claim 10, wherein the robot control part outputs the guide information including information for guiding an operation method of the robot to an operation apparatus that accepts the operation of the operator.

13. The robot control apparatus according to claim 10, wherein the robot control part outputs the guide information including information for confirming whether or not the state of the robot stops the action of the robot based on the scenario to be used to the operation apparatus which accepts the operation of the operator when the operation of the operator does not correspond to the action contents of the scenario to be used associated with the elapsed time at a point in time when the robot information acquisition part acquired the robot information.

14. The robot control apparatus according to claim 1, further including
    an instruction information acquisition part that acquires instruction information indicating that the operation of the robot starts from an operation apparatus which accepts the operation of the operator, wherein the robot control part starts the action of the robot based on the scenario to be used after the instruction information acquisition part acquires the instruction information.

15. The robot control apparatus according to claim 14, wherein the robot control part causes a storage part to store the elapsed time from stopping the action of the robot in the scenario to be used in association with operator identification information for identifying the operator when the instruction information acquisition part acquires instruction information for stopping the action of the robot based on the scenario to be used from the operator, and resumes the action of the robot from the action contents corresponding to the elapsed time at which the action of the robot is stopped in the scenario to be used when the instruction information acquisition part acquires instruction information for resuming the action of the robot based on the scenario to be used from the operator.

16. The robot control apparatus according to claim 14, wherein the robot control part stores a stop position, which is a position of the robot at the time the action of the robot is stopped, in association with operator identification information for identifying the operator when the instruction information acquisition part acquires the instruction information for stopping the action of the robot from the operator, and resumes the action of the robot from the stop position when the instruction information acquisition part acquires instruction information for resuming the action of the robot based on the scenario to be used from the operator.

17. The robot control apparatus according to claim 1, wherein the robot control part provides the operator with operation guide information based on the action contents indicated by the scenario to be used associated with the elapsed time corresponding to the time when the operator is operating the robot.

18. The robot control apparatus according to claim 1, wherein the robot control part starts the action of the robot based on the scenario to be used on a condition that permission is acquired from a sales-floor terminal, which is an information terminal of a sales floor where the robot performs the action.

19. The robot control apparatus according to claim 18, wherein the robot control part transmits prohibition information for prohibiting the robot from performing the action on the basis of the instruction transmitted from an operation apparatus, which accepts the operation from the operator, when the robot acquires, from the sales-floor terminal, a notification for refusing to perform an action other than a predetermined action.

20. The robot control apparatus according to claim 18, wherein the robot control part transmits information about the operator to the sales-floor terminal.

21. The robot control apparatus according to claim 18, wherein the robot control part transmits the action contents indicated by the scenario to be used to the sales-floor terminal.

22. A robot control method comprising:
selecting a scenario to be used which an operator who operates a robot uses while operating the robot from among a plurality of scenario candidates in which an elapsed time from a reference time and action contents of the robot are associated with each other; and
controlling the robot on the basis of the scenario to be used that are executed by a computer,
wherein the controlling step includes switching, on the basis of the scenario to be used, between (i) a manual operation period for operating the robot in accordance with an operation of the operator and (ii) an automatic operation period in which the robot control part operates the robot.

23. A robot control system comprising:
a robot; and
a robot control apparatus that remotely controls the robot, wherein the robot control apparatus has
a selection part that selects a scenario to be used which an operator who operates the robot uses for operating the robot from among a plurality of scenario candidates in which an elapsed time from a reference time and action contents of the robot are associated with each other, and
a robot control part that controls the robot on the basis of the scenario to be used, wherein
the robot operates on the basis of the scenario to be used received from the robot control part,
wherein the robot control part switches, on the basis of the scenario to be used, between (i) a manual operation period for operating the robot in accordance with an operation of the operator and (ii) an automatic operation period in which the robot control part operates the robot.

* * * * *